United States Patent [19]

Brown

[11] Patent Number: 4,867,622

[45] Date of Patent: Sep. 19, 1989

[54] LATERAL RESTRAINING DEVICE FOR CARGO CONTAINERS HAVING MORE THAN ONE WIDTH

[75] Inventor: James T. Brown, Central City, Pa.

[73] Assignee: Bethlehem Steel Corporation, Bethlehem, Pa.

[21] Appl. No.: 222,672

[22] Filed: Jul. 21, 1988

[51] Int. Cl.[4] .............................................. B61P 45/00
[52] U.S. Cl. ......................................... 410/54; 410/94
[58] Field of Search .................. 410/54, 71, 94, 95

[56] References Cited

U.S. PATENT DOCUMENTS

| | | | |
|---|---|---|---|
| 2,114,707 | 4/1938 | Fitch et al. ............................ | 410/94 |
| 3,085,518 | 4/1963 | Szczepanik et al. .................. | 410/54 |
| 3,321,162 | 12/1971 | Larssen et al. ....................... | 410/73 |
| 3,552,325 | 1/1971 | Enochian ............................. | 410/54 |
| 3,626,868 | 5/1967 | Connerat ............................. | 410/73 |
| 3,805,709 | 4/1974 | Schuller .............................. | 410/72 |
| 4,754,709 | 7/1988 | Gramse et al. ................... | 410/54 X |
| 4,759,294 | 7/1988 | Schuller et al. ................. | 410/71 X |

Primary Examiner—Johnny D. Cherry
Assistant Examiner—Gary C. Hoge
Attorney, Agent, or Firm—John I. Iverson

[57] ABSTRACT

A cargo container restraining device for preventing lateral movement of cargo containers being transported on freight vehicles the restraining device being adaptable to containers of different widths and comprising fixed and pivotal restraining assemblies where the pivotal restraining assemblies are interconnected by linkage to provide means for raising or lowering the pivotal restraining assemblies from either side of the freight vehicle.

6 Claims, 2 Drawing Sheets

LATERAL RESTRAINING DEVICE FOR CARGO CONTAINERS HAVING MORE THAN ONE WIDTH

BACKGROUND OF THE INVENTION

This invention relates to apparatus for laterally restraining cargo containers being transported on railroad container cars. It relates particularly to apparatus for laterally restraining the adjacent ends of two 20 foot long containers being transported on the same freight deck of an articulated railroad container car where the car is adapted to carry containers having a variety of lengths and widths.

The continuous development of cargo containers has resulted in standardized containers having four different lengths and two different widths. Today's state of the art container measures either 48, 45, 40 or 20 feet in length and either 8'-6" or 8'-0" in width. To handle such a variety of container sizes railroad container cars are being adapted to transport cargo containers built to any combination of the above dimensional limitations.

When 48, 45 or 40 foot long containers having widths of either 8'-6" or 8'-0" are transported on railroad container cars, a single container is carried on each freight deck and the four corners of the container are secured to the deck by locking devices which restrain the container against longitudinal and lateral movement. However, when 20 foot long containers having widths of either 8'-6" or 8'-0" are transported on the same freight decks, two containers are carried on each freight deck and only the outboard ends of the 20 foot containers can be secured by the locking devices. These locking devices will prevent longitudinal movement of the containers but the adjacent inboard ends of the two 20 foot containers are free to move laterally unless additional lateral restraining devices are provided. The additional lateral restraining devices must be readily adaptable to both the 8'-6" and 8'-0" wide containers as well as be removable to prevent interference when the longer containers are carried on the freight decks.

In the past, cargo containers have been restrained against lateral movement by removable or pivotal restraining devices. Although effective, these devices of the past have been inconvenient to use. They typically include restraining devices on one side of the freight car which operate independent of corresponding restraining devices on the opposite side of the freight car. Such arrangements require the use of two operators, one on each side of the freight car, or a single operator who must continually climb over the freight cars to operate the restraining devices.

SUMMARY OF THE INVENTION

It is therefore an object of this invention to provide a means for laterally restraining cargo containers being transported on freight vehicles. It is a further object of this invention to provide a means for laterally restraining the inboard ends of two containers being transported on the same freight deck. It is a still further object of this invention to provide a lateral restraining means adaptable to containers having a variety of widths. It is still a further object of this invention to provide a lateral restraining means which is pivotal between an upright active position and lowered stored position. It is still a further object of this invention to provide a lateral restraining device having multiple means to raise or lower pivotal restraining devices from either side of the freight vehicle.

It has been discovered that the foregoing objectives can be attained by providing lateral restraining devices on opposite sides of a freight vehicle each lateral restraining device comprising a fixed restraining assembly and a pivotal restraining assembly where the pivotal restraining assemblies are spaced inboard from the fixed restraining assemblies and are interconnected by linkage to provide multiple means for raising or lowering the pivotal assemblies from either side of the freight vehicle.

DESCRIPTION OF THE PREFERRED EMBODIMENT

Figure 1:
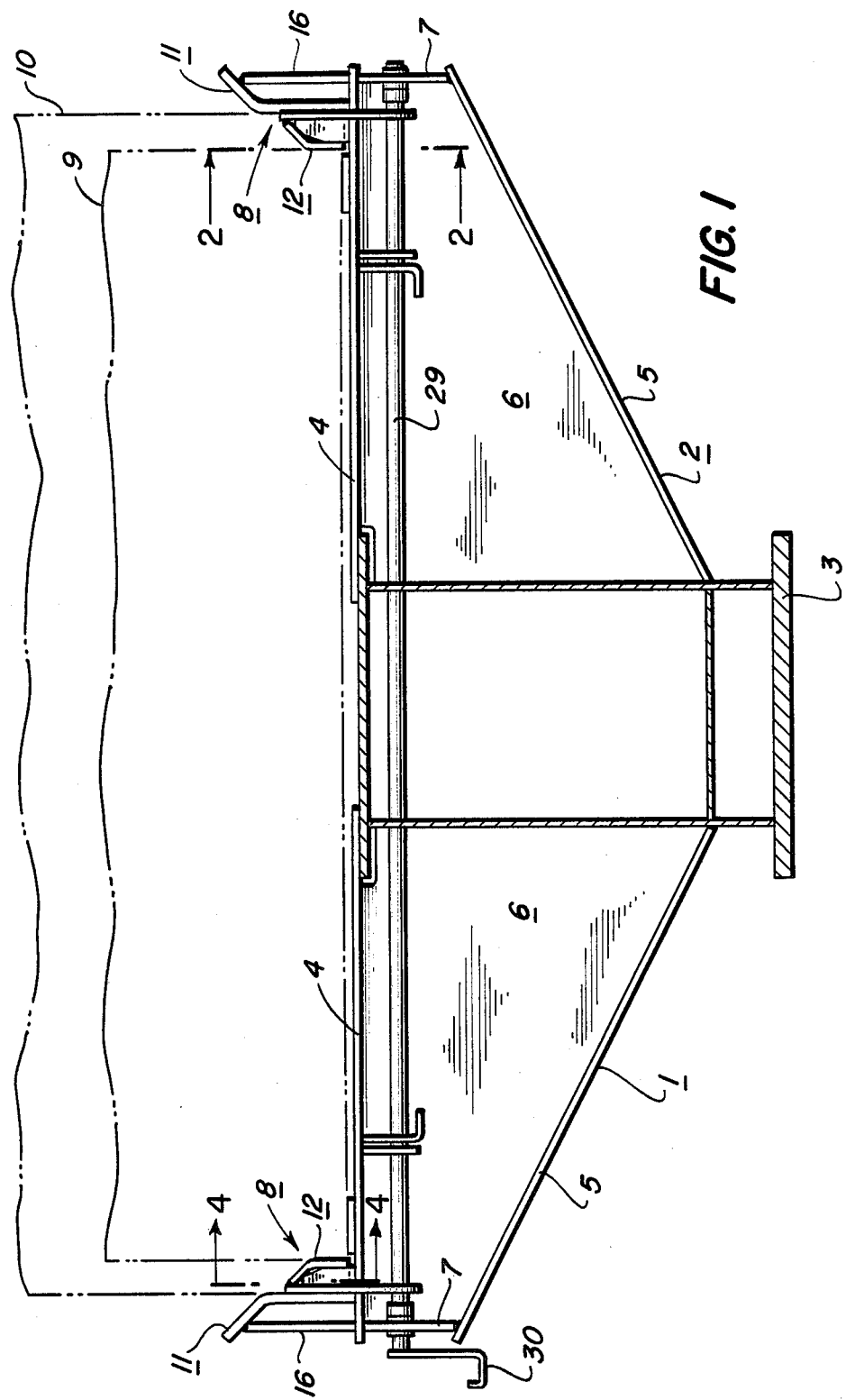
FIG. 1 is an elevational view showing lateral restraining devices of the invention located on opposite sides of a freight car.

Referring to FIG. 1 of the drawings, cantilevered structural members 1 and 2 are shown extending from opposite sides of the center sill 3 of a railroad freight car. Cantilevered members 1 and 2 are attached to center sill 3 by welding or other means and members 1 and 2 include top and bottom flanges 4 and 5, parallel webs 6 and end plates 7. The top flange 4 is arranged to function as part of the freight deck and provides a surface for supporting the various cargo containers which are placed upon the freight car.

A lateral restraining device 8 is attached to the outboard end portion of each of the structural members 1 and 2 by welding or similar means. Each lateral restraining device 8 includes a fixed lateral restraining means 11 and a pivotal lateral restraining means 12 spaced inboard from the fixed lateral restraining means 11.

Figure 2:
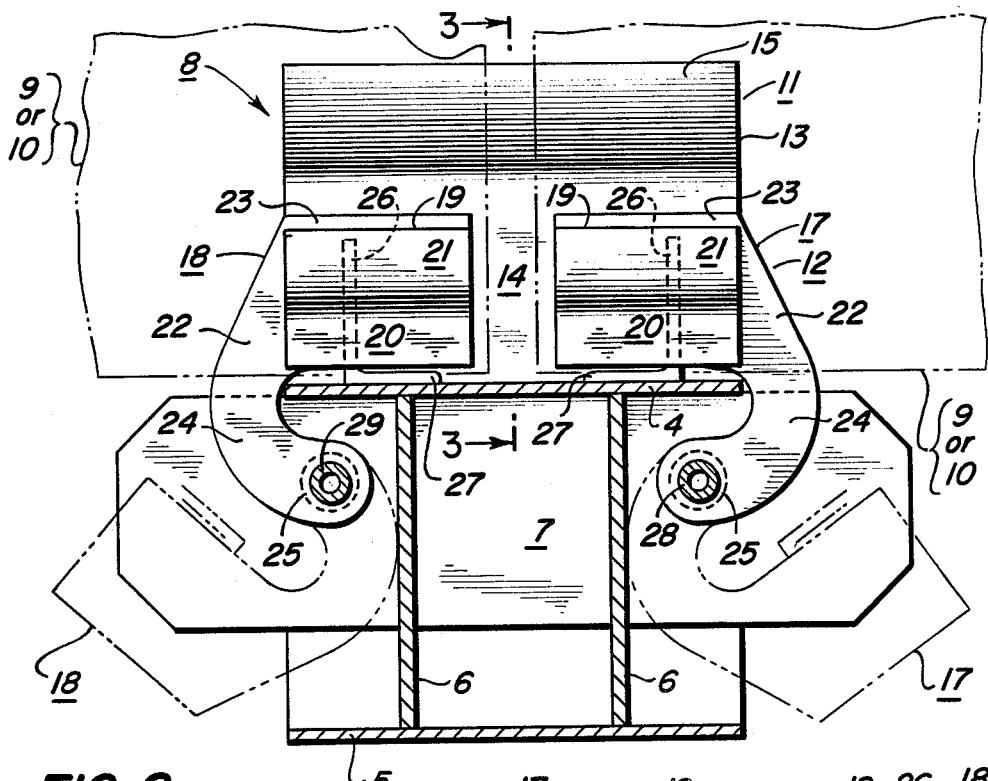
FIG. 2 is a cross-section view taken along the lines 2—2 of FIG. 1 showing a pivotal restraining assembly in both the raised and lowered positions.
Figure 4:
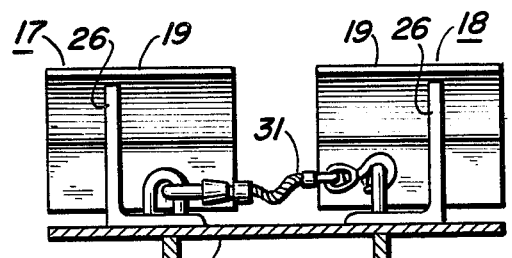
FIG. 4 is a cross-section taken along the lines 4—4 of FIG. 1 showing a locking means for the pivotal restraining means.
Figure 3:
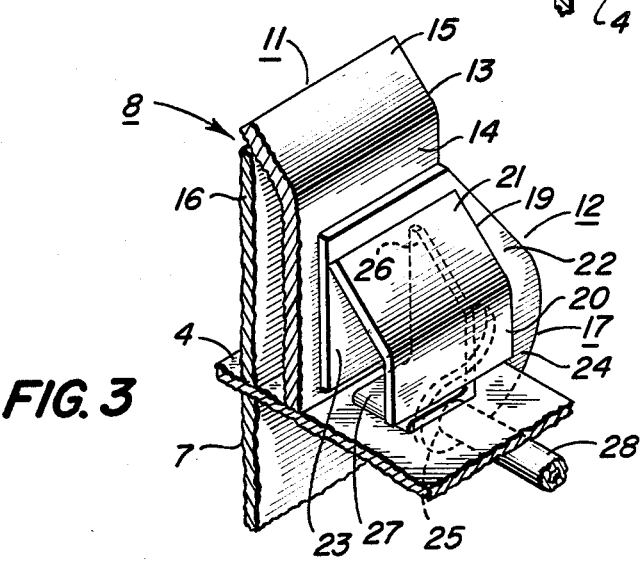
FIG. 3 is an isometric view taken along the lines 3—3 of FIG. 2 showing one half of a lateral restraining device.

As shown more clearly in FIGS. 2 and 3, each fixed lateral restraining means 11 is a weldment comprising a first plate 13 having a vertical surface 14 for laterally restraining a cargo container and an upper inclined portion 15 for guiding the containers as they are loaded onto the freight deck, and a second plate 16, spaced outboard from and parallel to the vertical surface 14 of plate 13. Plate 16 is attached to the underside of the upper inclined portion 15 of plate 13 and plates 13 and 16 are attached to the top flange 4 of each of the cantilevered structural members 1 and 2 by welding or other means.

Spaced inboard from each fixed restraining means 11 is a pivotal restraining means 12. Each pivotal restraining means 12 comprises a pair of pivotal assemblies 17 and 18. Each pivotal assembly 17 and 18 comprises a first plate 19, having a flat surface 20 for laterally restraining cargo containers and an upper inclined portion 21 for guiding the containers as they are loaded onto the freight deck, and a second plate 22, having a generally rectangular portion 23 and a curved leg portion 24. The inclined portion 21 of plate 19 is welded to the rectangular portion 23 of plate 22 and the curved leg portion 24 of plate 22 extends from the generally rectangular portion 23 to a pivot means 25.

The pivot means 25 is rotatably supported within the framework of the freight vehicle and the curved leg portion 24 is provided with an opening at one end for attachment to the pivot means 25.

Stiffeners 26, provided with bearing surfaces 27 which make contact with the top flanges 4 of the structural members 1 and 2 when the pivotal assemblies are in their raised active position, extend between plates 19 and 22 and are attached to plates 19 and 22 by welding or other means.

Parallel linkage 28 and 29, attached to the pivot means 25, interconnects the pivotal assemblies 17 and 18 of cantilevered member 1 to corresponding assemblies 17 and 18 of cantilevered member 2 thereby providing means to simultaneously raise or lower both of the pivotal assemblies to an active or stored position from either side of the railroad car.

Handles 30 may be provided for raising or lowering the pivotal assemblies 17 and 18 and locking means 31 may be provided to prevent accidental lowering of the pivotal assemblies 17 and 18 when they are in their raised position to laterally restrain containers.

As shown in phantom lines in FIGS. 1 and 2, the lateral restraining devices 8 are able to accommodate either two 8'-6" or two 8'-0" wide containers. When two 8'-6" wide containers 10 and 10' are loaded onto the deck of a railroad container car, the containers are positioned between corresponding fixed lateral restraining means 11 and the pivotal restraining means 12 are stored in their lowered positions as shown in phantom lines in FIG. 2. Likewise, when two 8'-0" wide containers 9 and 9' are loaded onto the freight deck, they are positioned between corresponding pivotal restraining means 12 which have been raised to their upright active position as also shown in FIG. 2. When the freight vehicle is transporting single containers of longer lengths, the pivotal restraining means 12 are stored in their lowered positions, as shown by the phantom lines in FIG. 2, to prevent interference with the larger containers.

Although the invention has been illustrated and described in certain embodiments, it is understood that other embodiments and changes may be made without departing from the scope of the invention. For example, the lateral restraining device of the invention could include additional pivotal restraining means to accommodate a greater variety of cargo container widths and lengths.

I claim:

1. A lateral restraining device for restraining containers being carried on freight vehicles said lateral restraining device comprising a fixed lateral restraining assembly provided with means to laterally restrain containers and at least one pivotal lateral restraining assembly, spaced inboard from said fixed lateral restraining assembly, and provided with means to laterally restrain containers said pivotal lateral restraining means including:
    (a) a first plate member having a flat surface for engagement with the side of a cargo container, and an inclined portion for guiding containers onto the deck of freight vehicles,
    (b) a second plate member parallel to said first plate member said second plate member comprising:
        (i) a substantially rectangular portion, and
        (ii) a curved leg portion extending from said substantially rectangular portion said curved leg portion having means provided at one end for attachment to a pivot means;
    (c) a pivot means rotatably supported within the framework of the freight vehicle and attached to said curved leg portion of said second plate member (b), and
    (d) linkage interconnecting each said pivotal restraining assembly to a corresponding pivotal restraining assembly located on the opposite side of the freight vehicle.

2. The lateral restraining device of claim 1 in which the pivot means (c) is provided with a handle means to facilitate the rotation of said pivotal restraining means.

3. The invention of claim 1 in which the said pivotal restraining assembly is provided with a locking means to prevent accidental rotation of said pivotal restraining means.

4. A railroad flat car having means provided for laterally restraining cargo containers said restraining means comprising a fixed lateral restraining assembly provided with means to laterally restrain containers and at least one pivotal lateral restraining assembly, spaced inboard from said fixed lateral restraining assembly, and provided with means to laterally restrain containers said pivotal lateral restraining means including:
    (a) a first plate member having a flat surface for engagement with the side of a cargo container, and an inclined portion for guiding containers onto the deck of said railroad flat cars,
    (b) a second plate member parallel to said first plate member said second plate member comprising:
        (i) a substantially rectangular portion, and
        (ii) a curved leg portion extending from said substantially rectangular portion said curved leg portion having means provided at one end for attachment to a pivot means;
    (c) a pivot means rotatably supported within the framework of the railroad flat car and attached to said curved leg portion of said second plate member (b), and
    (d) linkage interconnecting each said pivotal restraining assembly to a corresponding pivotal restraining assembly located on the opposite side of the railroad flat car.

5. The railroad flat car of claim 4 in which the pivot means (c) is provided with a handle means to facilitate the rotation of said pivotal restraining means.

6. The railroad flat car of claim 4 in which the said pivotal restraining is provided with a locking means to prevent accidental rotation of said pivotal restraining means.

* * * * *